United States Patent [19]

Love

[11] 4,450,671

[45] May 29, 1984

[54] COMBINE HARVESTER WITH MODIFIED FEEDER HOUSE

[75] Inventor: Mahlon L. Love, Osco, Ill.

[73] Assignee: Deere & Company, Moline, Ill.

[21] Appl. No.: 383,851

[22] Filed: Jun. 1, 1982

[51] Int. Cl.[3] .................... A01D 41/02; A01F 12/30
[52] U.S. Cl. ...................... 56/14.6; 130/26; 130/27 Z
[58] Field of Search ............ 56/14.6; 130/24, 25, 130/26, 27 R, 27 F, 27 H, 27 J, 27 P, 27 T, 27 Z, 27 AB, 27 AD, 27 AF

[56] References Cited

U.S. PATENT DOCUMENTS

| | | | |
|---|---|---|---|
| 2,617,425 | 11/1952 | Dion | 130/24 |
| 3,448,566 | 6/1969 | van der Lely | 56/14.6 |
| 3,555,790 | 1/1971 | Quick | 56/14.6 |
| 3,604,427 | 9/1971 | Boone et al. | 56/14.6 |
| 3,945,178 | 3/1976 | Delfosse et al. | 56/14.6 |

FOREIGN PATENT DOCUMENTS

| | | | |
|---|---|---|---|
| 232642 | 4/1969 | U.S.S.R. | 56/14.6 |
| 240362 | 8/1969 | U.S.S.R. | 56/14.6 |

OTHER PUBLICATIONS

Allis-Chalmers L2/M2 Gleaner Combines, Corn-/Soybean-Grain-Rice/Soybean, 1977,-cover and pp. 4-7.

Gleaner Harvester Corp.-Baldwin Combines 1941, cover and pp. 9-11.

*Primary Examiner*—Gene Mancene
*Assistant Examiner*—David I. Tarnoff

[57] ABSTRACT

The header of a combine harvester comprises a conventional forward gathering portion and a feeder house portion which contains elements for processing crop material as well as transferring it from the gatherer to the body of the combine. A threshing cylinder and concave combination receives crop material from the discharge opening of the gatherer and delivers that portion passing between the cylinder and concave to a first separating conveyor extending downstream from the concave, within the feeder house. A simple conveyor underlies the concave and first separating conveyor, to receive grain and chaff passing through the concave and also that passing downwards from the first separating conveyor and delivers it to the body of the combine, for transfer to a cleaning shoe. Material carried on the upper surface of the first separating conveyor is transferred to a second separating conveyor (straw walkers) in the body of the combine. In a preferred embodiment, the first and second separating conveyors comprise a unitary straw walker arrangement with downstream portions of the straw walkers extending cantilever fashion into the feeder house to terminate adjacent the concave discharge end.

5 Claims, 5 Drawing Figures

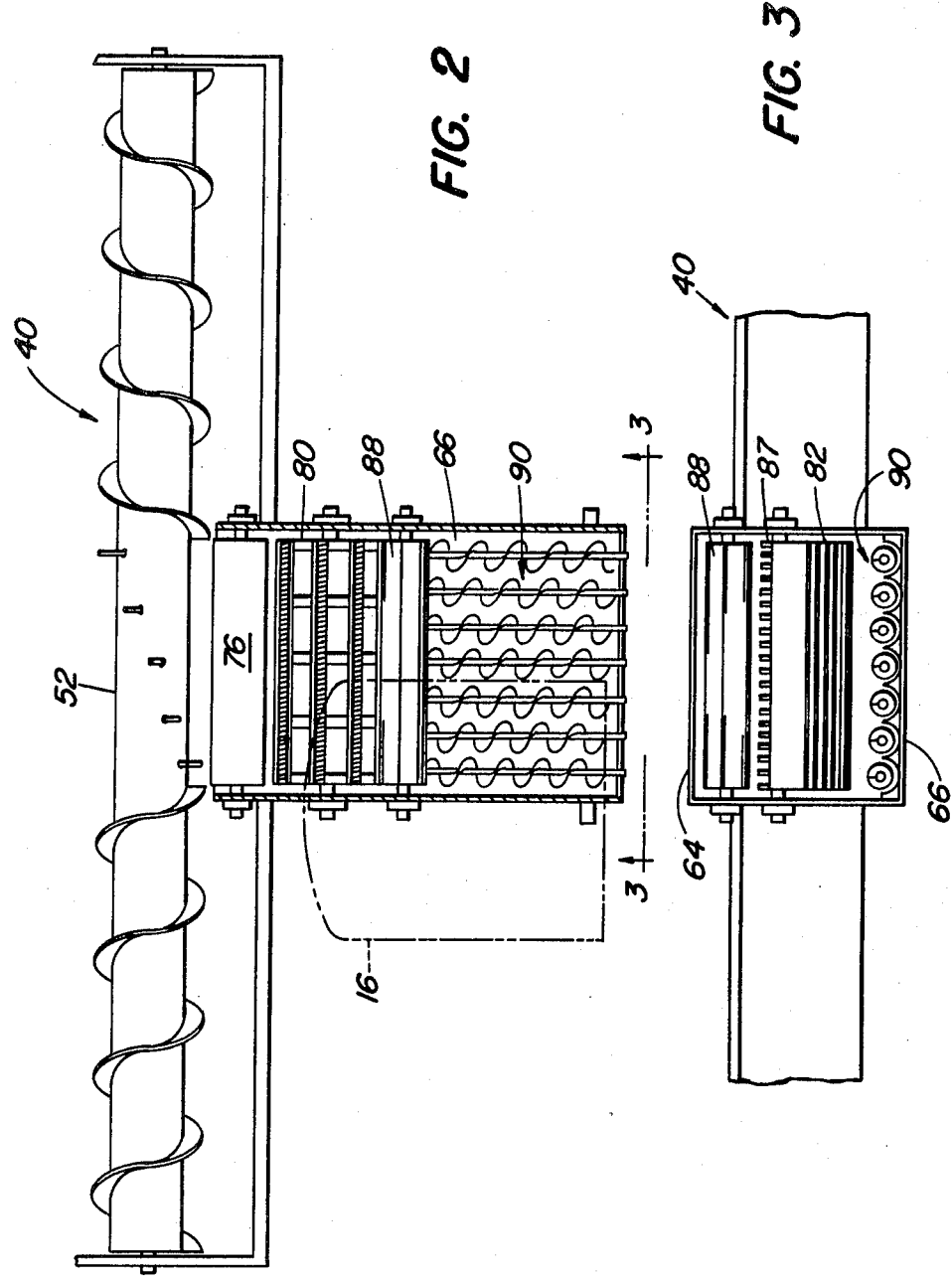

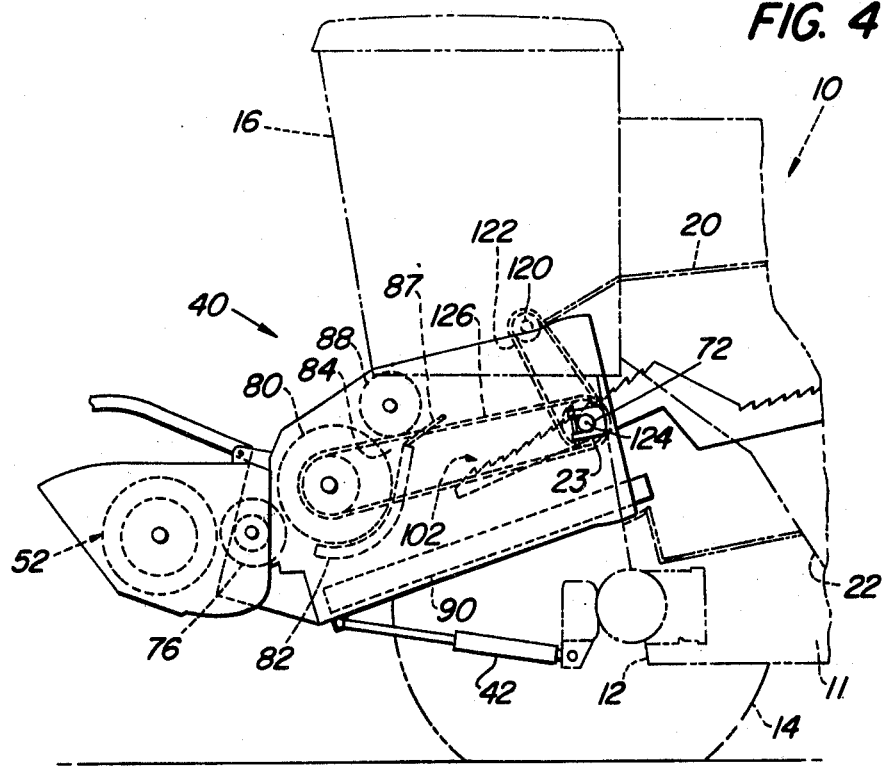

COMBINE HARVESTER WITH MODIFIED FEEDER HOUSE

CROSS REFERENCE TO RELATED APPLICATION

U.S. patent application, Ser. No. 383,848, filed simultaneously herewith in the name of Karl Gunter Gorsler entitled COMBINE HARVESTER WITH MODIFIED FEEDER HOUSE and assigned to the assignee of the invention herein is directed in a preferred embodiment to a combine harvester arrangement in which threshing and separating elements are carried in the feeder house as well as in the combine body. To the extent that the invention disclosed and claimed in application Ser. No. 383,848 is disclosed herein, it is done so only for completeness of description of the operative environment of the invention claimed herein and thus forms no part of the invention claimed herein.

BACKGROUND OF THE INVENTION

This invention is concerned with crop handling and processing in combine harvesters, and more particularly with combines in which a forward mounted header is modified to include crop processing means as well as the usual functions of gathering and conveying of crop material to the body of the combine.

The modern conventional combine has reached a high state of evolution. The "standard" configuration of separator body, with forward transverse threshing cylinder and rearwardly extending separating straw walkers above a cleaning shoe (reciprocating chaffer and sieve), is potentially very efficient and well enough understood by operators that good operating efficiency is commonly achieved. But in recent times, with the continuing demand for larger capacity machines for potentially higher labor productivity, coupled with limits on vehicle width and height dimensions imposed by government regulation as well as practical considerations, the impetus to improve combine volumetric efficiency has intensified.

Any linear oscillating floor conveyor type separator, such as the conventional straw walker, is much more bulky than the threshing cylinder-concave combination or the cleaning shoe which may be matched with it in a given combine. Therefore, for a given increase in vehicle total capacity, the separating portion contributes a disproportionate share to the overall increase in vehicle size or bulk. Merely increasing the length of the separator elements, such as straw walkers in a standard combine configuration (that is with the straw walkers contained within the body of the combine), provides only limited opportunity for increasing combine capacity. Excessively long vehicles are more difficult to maneuver and present problems in shipping. However, modification of the header, and particularly the conventional feeder house, is another possible source of improvement in volumetric efficiency.

The headers of most modern conventional combines share a somewhat standard form—a form at least partly determined by their functions of gathering crop material and converging and delivering it to the necessarily elevated inlet of a mobile threshing machine. The main components of the typical header are a laterally elongated gathering portion, and a closed tunnel-like feeder house sloping rearwardly and upwardly for transferring material from the gatherer to the separator body. The feeder house is usually of about the same width as the separator body itself and pivotally connected to the body, so that the whole header may be selectively pivoted about a transverse axis for controlling operating height of the gatherer portion. Functional considerations, such as maintenance of a suitable gatherer attitude and direction of flow of material from the feeder house into the threshing zone at all operating heights, combine to establish a minimum desirable length of header, from pivot to gatherer.

Typically then, the feeder house functions only as a conveyor but is comparatively bulky and occupies a significant portion of the length of the combine. Many attempts have been made to begin the processing of the harvested crop in the feeder house, so as to improve overall vehicle volumetric efficiency as well as use power absorbed by the feeder house more productively. These attempts have included placing the threshing cylinder "down-front" in the feeder house as well as more radical departures, such as placing full width rotary threshing and even separating members in tandem with the cross auger of the gatherer. In the latter arrangement, the threshing member receives crop material directly from the cross auger so that it is threshed and separated while being converged for eventual delivery of both the grain and the straw, or just the grain, to the separator body for final cleaning and/or separating (see, for example, U.S. Pat. No. 3,945,178 Delfosse). A current commercially available example of the down-front cylinder arrangement is found in the Allis-Chalmers conventional combines (as distinguished from the same manufacturer's axial flow rotary combines). The crop handling and processing portions of these combines have a configuration similar to that disclosed in U.S. Pat. No. 3,604,427, Boone.

Boone's arrangement only partially realizes the potential of the feeder house space as crop processing space. His partially open concave permits some separation but a large portion of the feeder house is still used only for conveying material rearwardly and upwardly into the separator body. Although some dispersion of material is attempted, through the use of an "aspirating" beater engaging the material discharged from the threshing space of the concave, only a single (belt) conveyor is provided for all material delivered from the feeder house so that the major portion of the separating job still remains to be done within the body of the combine. No positive or mechanical separation means other than the cylinder and concave combination is provided in the feeder house itself.

In a published West German patent application, OS No. 1,582,642, (corresponding to U.S. Pat. No. 3,448,566) van der Lely discloses another down-front cylinder arrangement. In a rather squat combine configuration, the feeder house conveyor has been eliminated through the expedient of spacing the operator's station and (particularly) the front wheels rearwardly, making feasible a drooping of the forward body portion housing the threshing cylinder and a forward portion of the separator mechanism. Apparently only the gatherer is vertically adjustable and it is not seen how the necessary range of gatherer operating height could be provided without unacceptable changes in gatherer attitude with respect to the ground or to the threshing cylinder inlet.

SUMMARY OF THE INVENTION

Accordingly, an object of the present invention is to provide, in a generally conventional combine, an arrangement of threshing and separating components which improves the overall volumetric efficiency of the vehicle while avoiding the shortcomings of earlier attempts such as those described above.

Given that the combine is a crop gathering, processing and transporting machine, a major design objective must be to make the most productive use (for gathering, processing and carrying or holding) of all the relevent spaces defined by the vehicle and to avoid using such spaces merely for conveying of material internally, from one part of the vehicle to another. Thus, a particular object is to make better use of the feeder house space by beginning crop material processing in its lower forward portion and continuing the processing as material moves through the remainder of the feeder house, en route to the separator body.

The main, mobile body of the combine and, in particular, the combination of its threshing, separating and cleaning components, is commonly referred to as the separator. Using this terminology, it is an object of the invention to extend the separator forward of the main body of the combine. The feeder house may become an extension of the separator. Or the separator may be considered as having two portions—a main portion carried in the separator body by the combine vehicle main frame, supported directly by the wheels of the combine, and a forward portion, pivotally connected to the main portion.

In keeping with the invention, the separating mechanisms may extend into the feeder house so that there are active positive mechanical separating means extending longitudinally in the feeder house, for supporting and conveying material while oscillating to achieve separation. A threshing cylinder and concave, with transverse axis of rotation, may be provided at the upstream or lower end of the feeder house for receiving crop material from the gatherer, processing it and delivering at least a portion of it substantially directly to a forward portion of the forwardly extending separating means within the feeder house, while, if the concave is open, another portion of the material passes outwards and downwards, through foramina of the concave, for reception by a grain and chaff conveyor and delivery into the combine body, independently of material carried into the body by the separator extension.

The separator means extending into the feeder house may be of the same type as that in the separator body and may in fact be integral with separating elements in the separator body. The separating means may be of the endless belt conveyor— perforated floor type or a reciprocating type such as a straw rack or walkers. A separating element, such as a straw walker for example, may extend cantilever fashion from the separator body into the feeder house, the whole element operating as a unit and supported and actuated entirely from within the separator body.

It is a feature of the invention that the circumferential discharge of material from the threshing zone between cylinder and concave is arranged to be adjacent the upper wall of the feeder housing and so that the material is readily received onto the forward portion of any cantilevered separating element extension in the feeder house, throughout the operating height range of the gatherer. A particular combination of discharge beater and extension of the concave may facilitate and control this transfer of material onto the separating elements in spite of the varying spatial relationship between the threshing mechanism (carried by the header) and the upstream end of the separator elements (carried by the separator body) due to the raising and lowering of the header.

BRIEF DESCRIPTION OF THE DRAWINGS

FIG. 2 is a partially sectioned overhead view of the header of the combine taken approximately along line 2—2 of FIG. 1.

FIG. 3 is a rear view of the feeder house taken along line 3—3 of FIG. 2, with the header detached from the combine body.

FIG. 4 is a schematic partial side elevation of the forward portion of the combine showing the header in transport position.

FIG. 5 is a view similar to FIG. 4 showing the transfer relationship between the threshing cylinder and straw walkers with the header at the upper end of its operating height range.

DESCRIPTION OF THE PREFERRED EMBODIMENT

Figure 1:
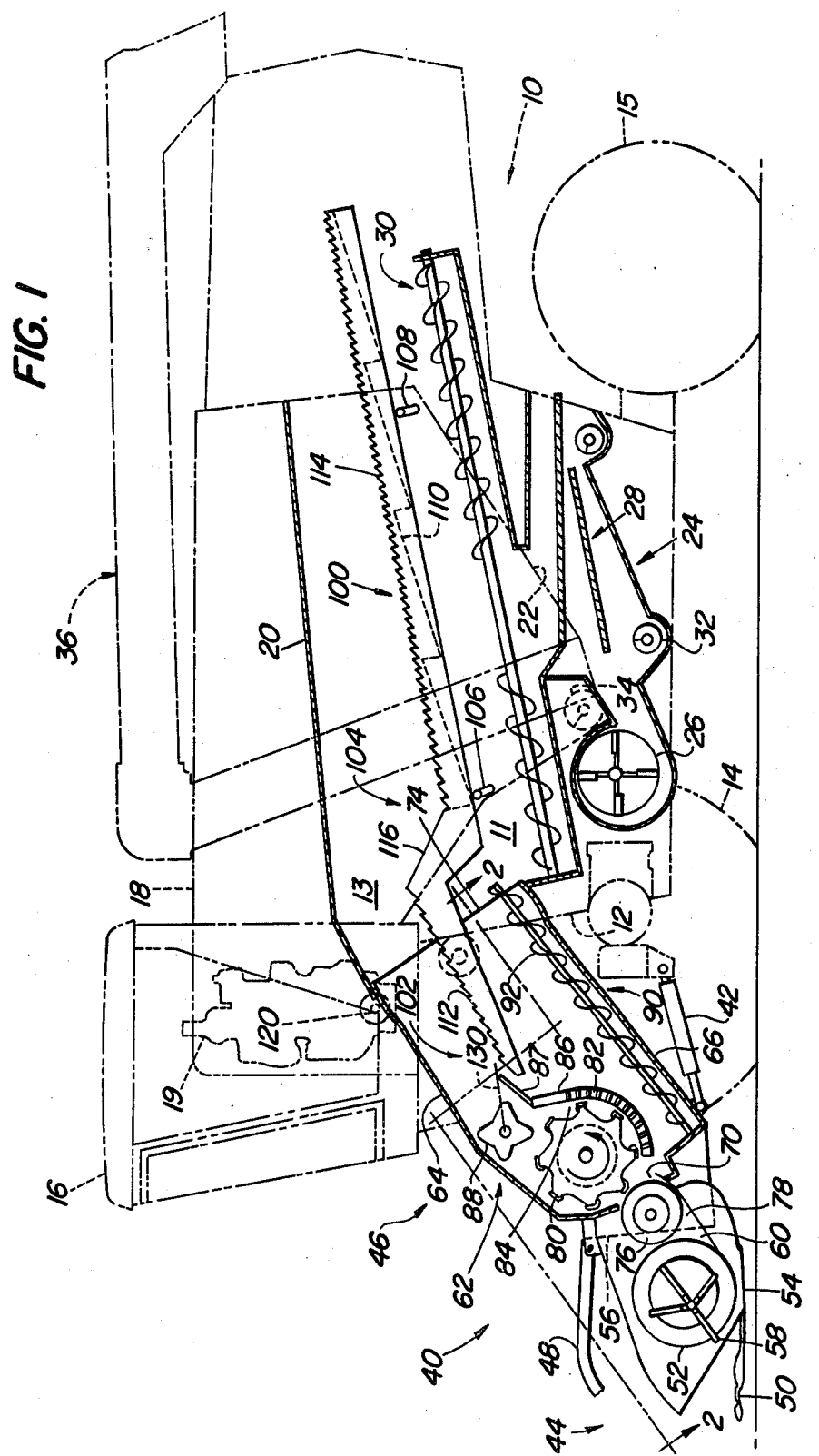
FIG. 1 is a partially sectioned side view of a combine embodying the invention with the header positioned towards the lower end of its operating height range.

The invention is embodied in a self-propelled combine shown in partially cut-away, semi-schematic side elevation in FIG. 1. The generally conventional aspects of the machine will first be described.

The combine separator body 10, having opposite sidewalls 11 and a forward wall 12 with an inlet opening 13, is supported above the ground on a pair of front drive wheels 14 and steerable rear wheels 15. An operator's station 16 is mounted relatively high and forward of the body 10, immediately ahead of a grain tank 18 and offset to the left. An engine 19 is mounted to the right of the operator's station. The tank is of the well-known saddle-type with a relatively shallow central portion, the floor of which is indicated at numeral 20 in FIG. 1, and includes a pair of opposite depending tank portions 22, flanking the sides of the separator body 10. A pair of header pivot brackets 23, are carried at the respective forward edges of the body sidewalls 11.

A lower portion of the separator body is occupied by a cleaner mechanism 24 equipped with a blower 26 for aspirating a pair of oscillating sieves 28. Separated grain is delivered to the cleaner 24 by banks of augers 30, substantially spanning the width of the separator body 10.

Clean grain from the cleaner 24 is collected by clean grain auger 32 and then elevated to the grain tank 18 by a clean grain elevator (not shown). A grain tank cross auger 34, open to both depending portions 22 of the grain tank, feeds an unloading auger system 36 for unloading the grain tank.

A forwardly carried header 40 is pivotally supported in the header pivot brackets 23. A pair of hydraulic cylinders 42 extend between the frame of the combine body 10 and the underside of the header 40 and are operable to pivot the header 40 about the transverse axis provided by the pivot brackets 23 for controlling the operating height of the header. The header 40 is made up of a forward mounted gatherer 44 and what will be called for convenience, a feeder house 46.

The gatherer 44 is, in this exemplary embodiment, of the cutting platform type in which a forward mounted reel (not shown) carried on reel arms 48 guides crop material into engagement with a cutterbar 50 and, after severing of the material, into engagement with an elongated laterally extending platform auger 52. Cooperating with the platform floor 54 and rear wall 56, the auger 52 converges the gathered material to the center of the platform (see FIG. 2) where conventional retractable fingers 58 carried by the auger assist in discharging material rearwardly and upwardly through the gatherer discharge opening 60.

The feeder house includes a housing 62 forming a tunnel-like passageway sloping rearwardly and upwardly and defined by a top wall and floor, 64 and 66 respectively, and opposite generally upright sides 68. The forward inlet 70 of the housing 62 registers with the discharge opening 60 of the gatherer, and the feeder housing 62 and the gatherer 44 are releasably coupled together in the usual way.

Opposite, short, laterally extending arms 72 are carried adjacent the midpoint of the rearward edge 74 of the feeder housing sidewalls 68 and are retained in the header pivot brackets 23 to effect the pivotal support of the header. The upper, downstream, end of the housing 62 fits within the body inlet opening 13 so that the header 40 may pivot up and down.

Turning now to other aspects of the combine, including those which depart from the conventional—a transversely extending feeder beater 76 is rotatably carried between the feeder house walls 68 adjacent the inlet 70 so that it engages crop material discharged by the platform auger 52 and carries it rearwardly and upwardly over an extension 78 of the floor 54 and into engagement with a threshing cylinder 80. An open concave 82 partially wraps the cylinder 80 to define a threshing zone 84 and an extension portion 86 extends approximately vertically upwards when the header is within its operating height range and a finger bar grate 87 extends rearwardly and upwardly from its downstream edge. A second beater 88 close to the feeder housing top wall 64 is positioned to control the crop material discharged from the threshing zone 84.

A conveyor 90 formed by a bank of fore-and-aft extending side-by-side collecting and conveying augers 92 similar to the conveyor 30 in the body of the combine, convers the floor 66 of the feeder housing 62 and has a delivery end extending rearwardly somewhat beyond the floor (see FIGS. 2 and 3).

A straw walker array 100 extends fore-and-aft, occupying a central portion of the combine body 10 within the tunnel formed by the depending tank portions 22 and the tank central floor portion 20 and extends forward into the feeder house to terminate at a forward end 102 in a receiving relationship with material forwarded by the discharge beater 88. The straw walker array 100 is made up of five side-by-side individual walkers 104 each supported in the conventional way for reciprocation on similar forward and rear cranks 106, 108 respectively (only one walker 104 is shown in the drawings). Each straw walker unit 104 is generally conventional in construction and includes foraminous floor portions 110 and is of stepped configuration including a front portion 112, a main or rear portion 114 connected by the step portion 116.

Drives for all combine components are generally conventional and taken from the power shaft 120 of the engine 19. Only an exemplary portion of the drives is shown (and seen best in FIG. 4), including a header countershaft drive 122 conveying power from the engine to a header drive countershaft 124, coaxial with the header pivot 23, and a cylinder drive 126 connected to the cylinder 80.

In operation, gathered crop material reaches the threshing cylinder 80 through the conventionally functioning gatherer 44 aided by the beater 76. Most threshing and a major portion of the separation of the crop material take place in the threshing zone 84 between cylinder and concave, and grain and other small fractions pass through the openings in the concave and down into engagement with the conveyor 90. (Note: an at least partially open concave is preferred but not essential to the invention.) The remaining material, mostly straw and chaff, continues through the threshing zone to be engaged by the second beater 88 which decelerates the material and deflects it downwards towards the straw walkers.

To make full use of the separating capacity of a separating element, such as the straw walkers of the present embodiment, obviously crop material should be delivered as close to the front end of the element as possible. In this respect, the general spatial relationship of beater (88) and finger grate (87) to separating element forward portion (102) are essentially similar to those of a conventional combine. However, when the separating element is tied to the body of the combine as in the present embodiment, the relative movement between the separating element and the beater/finger grate combination carried by the feeder house must be considered. At the lower end of the operating height range (see FIG. 1) the relationship may be substantially the same as the fixed relationship in a conventional combine. Note, for purpose of comparison, where the extension of a line 130 from the center of beater 88 through the extremity of the finger grate 87 meets the straw walker portion 112. At the upper end of the operating height range (FIG. 5) the beater 88 is somewhat elevated above the straw walker portion 112 but, of course, the angle of the indicative trajectory line 130' is now depressed, indicating that crop material is still deposited close to the front end of the straw walker. Clearly a header pivot axis (23) relatively closer to the discharge beater 88 and close to the mean level of the straw walker end would tend to minimize the fore-and-aft movement of the impact area relative to the straw walker as operating height changes.

Separated grain and small fractions of material may pass downwards through foramina 110 of the straw walkers forward portion 102 to be collected by the auger conveyor 90 and delivered by way of the collecting augers 30 to the cleaner 24.

The main mass of straw and other large material fractions are supported on the straw walkers 100 and "walked" rearward for discharge from the rear end of the combine while separating (and collection by the conveyors 30) continues.

It can be seen from this exemplary embodiment that the volumetric efficiency (capacity per unit volume) may be increased significantly from a lengthing of straw walkers (in a given size conbine) to reach into the feeder house of the combine which becomes in effect a pivotable forward extension of the separator body. The feeder house is modified by making it somewhat deeper than is conventional to accommodate the threshing cylinder and concave, 80 and 82, and the floor conveyor 90 and to allow for relative movement between the straw walker forward portion 102 and the feeder house 46. Desirable geometry of the header with respect to pivot location and distance of gatherer from pivot is maintained, and the effectively longer straw walker, with potentially greater separating capacity, is provided without increasing the overall length of the combine.

If the forward portion of the straw walker is cantilevered into the feeder house as in the present embodiment, no extra straw walker or separating conveyor operating mechanism is needed although the forward separator mechanism support (106 here) may need to be made relatively stronger because of the extra forward loading of the separator conveyor (corresponding to straw walker forward portion 102).

It is a feature of the invention that the feeder house contains two crop processing elements, the threshing cylinder and concave (80, 82) and the separating conveyor (straw walker portion 102). With the addition of the grain and chaff conveyor (90) and with the separating mechanism (102) functioning as a conveyor as well as a sepaarator, there are in effect two conveyors independently delivering material through the forward wall 12 of the separator body 10. The separation of material which is begun at the lower portion of the feeder house is maintained and there is no further commingling of the material as in some known machines where only a single conveyor delivers material from the feeder house to the body of the combine even after initial separation by a down-front cylinder.

I claim:

1. A combine harvester having a mobile body including elongated fore-and-aft oriented means for separating grain from threshed crop material while conveying that material rearwardly and cleaning means for receiving grain and chaff separated from the threshed crop material and a forward header including a gatherer for removing crop material from a field and a feeder house rigidly connected to the gatherer and pivotably connected to the body for pivoting about a transverse axis for transferring crop material from the gatherer to the combine body characterized in that:

the feeder house includes a forward transversely mounted threshing cylinder and concave combination for receiving crop material from the gatherer, processing it and discharging it within the feeder house and in that the elongated separating means includes a contiguous forward receiving portion extending from the body into the feeder house and disposed so as to receive at least a portion of the crop material discharged by the threshing cylinder and concave combination, said separating means including at least one elongated member movably and drivably supported by the body and a forward extension portion integral with the main portion and extending cantilever fashion into the feeder house.

2. The combine of claim 1 further characterized in that the elongated member is a straw walker supported for longitudinal reciprocation.

3. The combine of claim 1 further characterized in that the straw walker forward portion extends into the feeder house not less than approximately half of the length of the feeder house.

4. A combine harvester having a separator housing including means for processing crop material delivered to the housing and forward means for gathering crop material from a field and delivering it to the housing and including a mobile frame supported above the ground by at least one pair of transversely spaced wheels characterized in that the separator housing includes a body portion rigidly connected to the mobile frame and a forward extension portion pivotally supported by the body portion for pivoting movement about a transverse axis and in that the means for processing crop material includes at least one elongated unitary separating member extending fore-and-aft and spanning at least a portion of both portions of the separator housing upstream and downstream of the transverse axis, the separator housing body portion including support means for the separator element and the forward portion of the separator element extending cantilever fashion into the separator housing forward extension portion.

5. A combine comprising: a mobile separator body including a fore-and-aft elongated separating means and carrying a gatherer for removing crop material from a field;

a feeder house for transferring crop material from the gatherer to the separator body, having a generally rectangular housing providing a passageway for the transfer of crop material and including a downstream outlet end pivotably connected to and having an outlet communicating with the separator body and an upstream inlet end having an inlet end connected to the gatherer;

a threshing cylinder mounted in the feeder house adjacent the feeder house inlet for rotation about a transverse axis;

a concave partially wrapping the cylinder and defining with the cylinder a circumferentially extending threshing zone;

a fore-and-aft oriented elongated separating device included in the feeder house and having an at least partially foraminous carrying surface disposed downstream of the threshing zone in a receiving relationship with the threshing zone and operable to oscillate crop material while conveying it rearwardly so that a portion of the crop material may pass downward through the foramina of the separating element; and the separating means of the mobile body including a receiving portion adjacent the feeder house outlet and the feeder house separating device having a downstream discharge end contiguous with and in a direct crop material transfer relationship with said receiving portion, the feeder house separator element being supported by the combine body and extending cantilever fashion into the feeder housing and the threshing cylinder being carried in a fixed relationship to the feeder housing so that pivoting movement of the header relative to the combine body for controlling height of the gatherer above the ground, results in relative movement between the threshing cylinder and the separator element.

* * * * *